INVENTOR.
HAROLD BELOFSKY

BY
Roland A. Anderson
Attorney

INVENTOR.
HAROLD BELOFSKY

BY
Roland A. Anderson
Attorney

INVENTOR.
HAROLD BELOFSKY
BY
Roland A. Anderson
Attorney

United States Patent Office 3,296,032

Patented Jan. 3, 1967

3,296,032

POWER FLATTENING DEVICE FOR RADIOISOTOPE HEATED THERMOELECTRIC GENERATOR

Harold Belofsky, Verona, N.J., assignor to the United States of America as represented by the United States Atomic Energy Commission Filed Jan. 17, 1964, Ser. No. 338,539
8 Claims. (Cl. 136—202)

This invention relates to radioisotope heated thermoelectric generators and more particularly to a power output flattening system therefor.

Radioisotope heated thermoelectric generators have been useful for remote electrical power sources in space craft but due to the radio-nuclide decay of their radioisotope heat sources, these devices have had a power output decline which has limited their usefulness and operating lifetimes. It has been universally recognized, therefore, that it would be advantageous to provide means for flattening the power output of these generators.

Various proposals have been made and used to accomplish such power flattening, including movable mechanical shutter arrangements for throttling the heat ejection from the generator radiators and while these arrangements have been useful and can accomplish the desired power flattening, they do require the manufacture and assembly of moving mechanical parts which are costly and may be subject to undesirable thrusts. Furthermore, complicated or expensive auxiliary actuating equipment has been required or it has been difficult or impossible to make the power flattening operation smooth or gradual. Additionally, it has been advantageous to provide an automatic, low cost power flattening system with components having low weight, high efficiency, safety and reliability.

It is an object of this invention, therefore, to provide an improved power output flattening system for a radioisotope thermoelectric generator;

It is also an object of this invention automatically to flatten the power output in a radioisotope heated thermoelectric generator for use in space;

It is also an object of this invention to provide a radioisotope powered thermoelectric generator with a light weight, efficient, safe and reliable power flattening system;

It is also an object of this invention to provide a power flattening system with a reduced number of moving mechanical parts and actuating equipment;

It is a further object of this invention to provide a smooth gradual power flattening method and apparatus.

It is still further object of this invention to provide a simple, reliable and efficient system for the compensation of ejectment thrusts.

In accordance with this invention, a power flattening system is provided having a heat conducting evaporable means for throttling the heat removal. The method and construction involved in this invention utilizes standard and well known techniques and apparatus and is highly flexible for a wide range of applications, missions and types of vehicles. More specifically, this invention involves the use of heat conducting means that slowly evaporates between a heat source and a radiator to control the heat flow from the heat source to the space surrounding the generator. With the proper arrangement, selection and application of the evaporable means as hereinafter to be more particularly described, it is possible by this invention to obtain the desired powei flattening and compensation for ejection thrusts.

Various other objects and advantages will appear from the following description of the invention, and the novel features will be particularly pointed out hereinafter in connection with the appended claims.

In the drawings where like parts are marked alike:

Figures 3A, 3B, 3C:
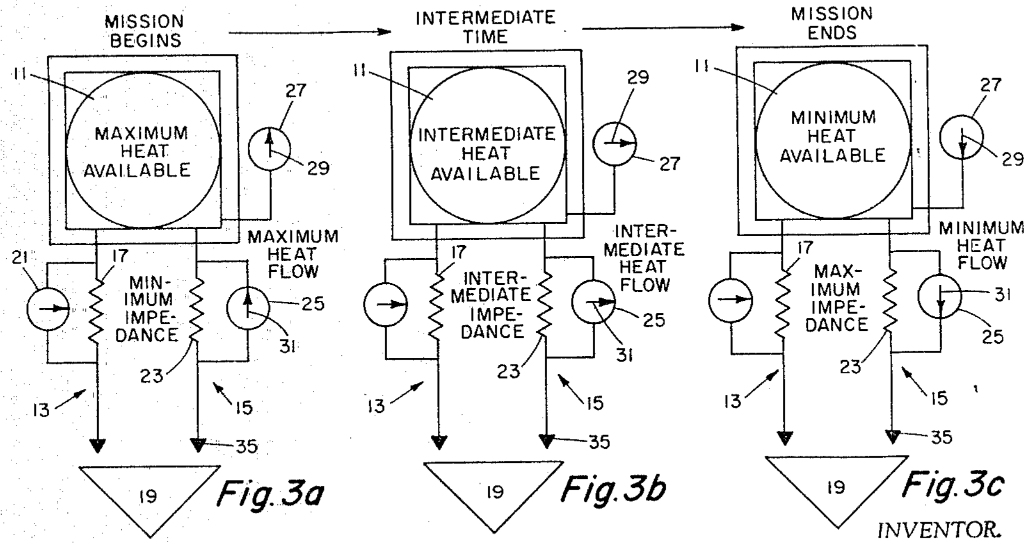
Figure 4:
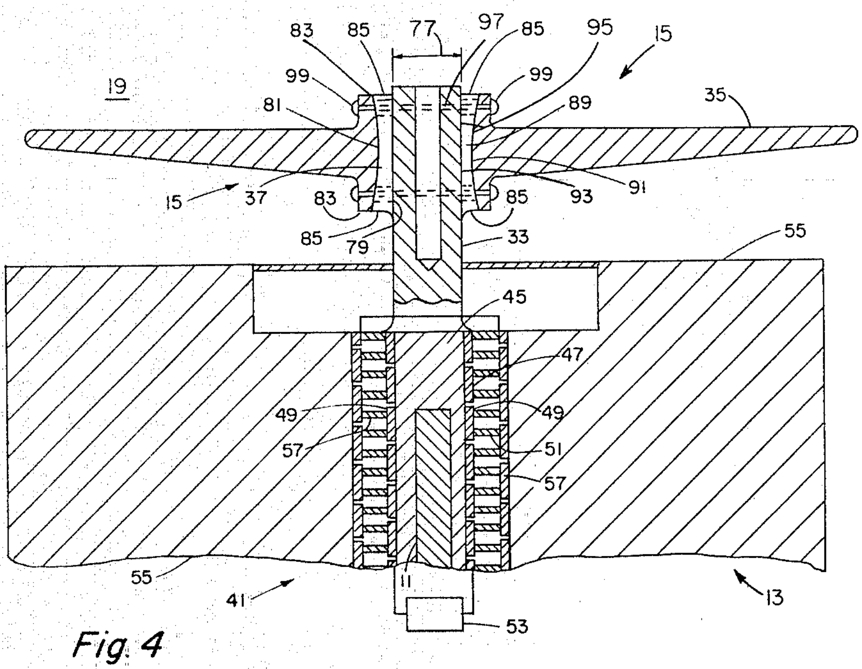
Figure 5:
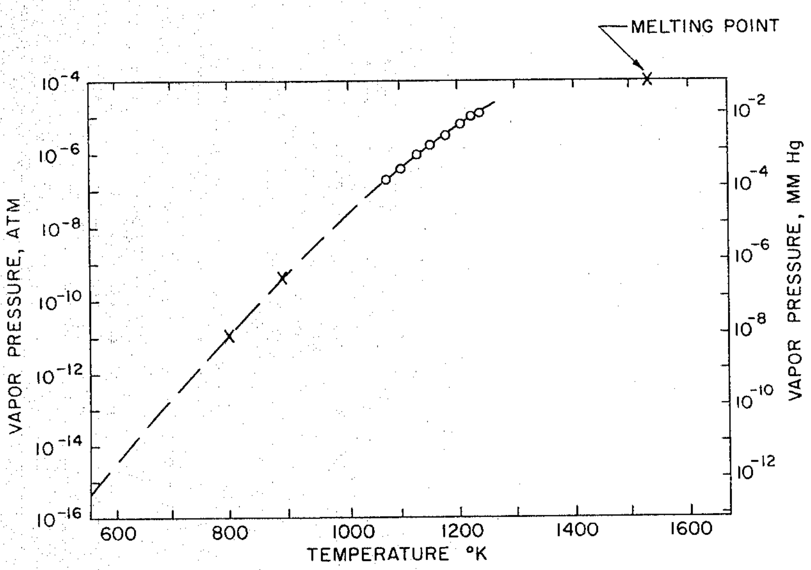
Figure 6:
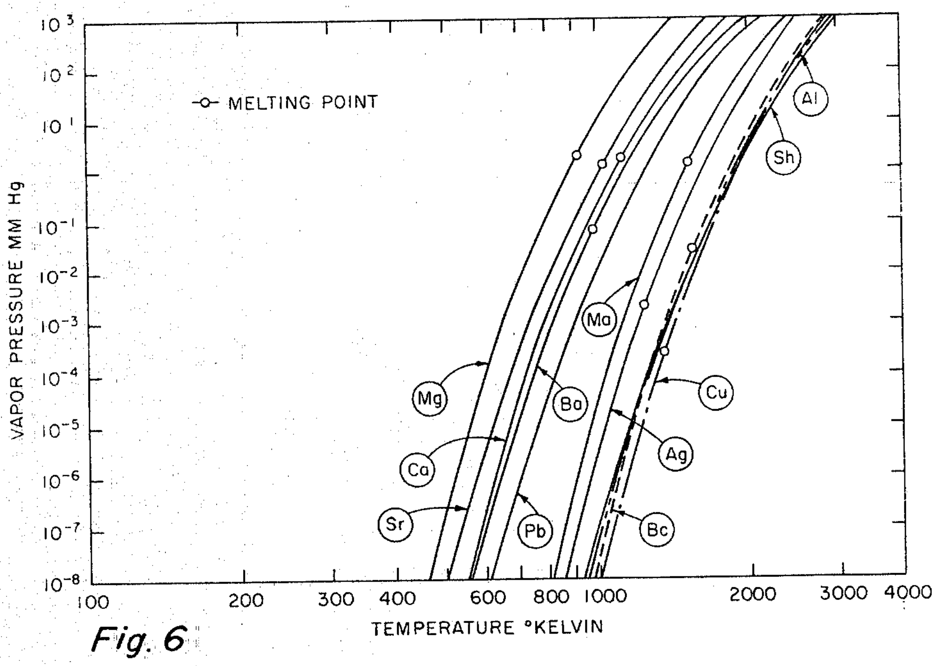
Figure 7:
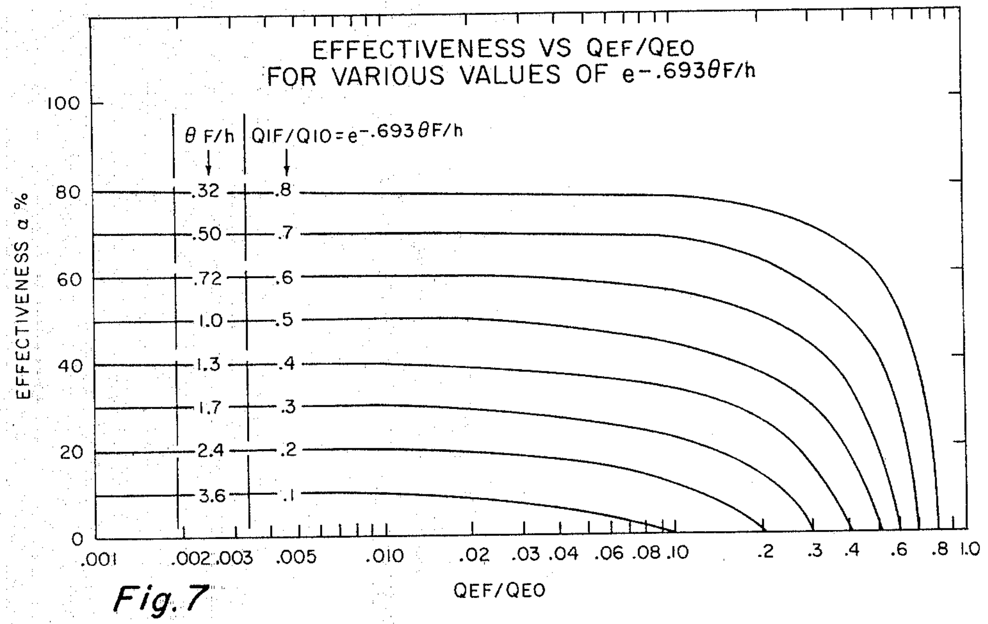

FIG. 3*a*, FIG. 3*b* and FIG. 3*c* are diagrammatic illustrations of the principles involved in this invention in a sequence from the beginning of the mission to the end of the mission operating lifetime;

FIG. 4 is a partial cross-section of RTG in which the power flattening system of this invention is obtained;

FIG. 5 is a graphic illustration of the vapor pressure vs. temperature of an Mn evaporable conductor for the apparatus of FIG. 4;

FIG. 6 is a graphic illustration of the vapor pressure vs. temperature for additional evaporable conductors for the apparatus of FIG. 4;

FIG. 7 is a graph of the percent effectiveness of the system of this invention vs. initial excess heat/final excess heat.

Figure 1:
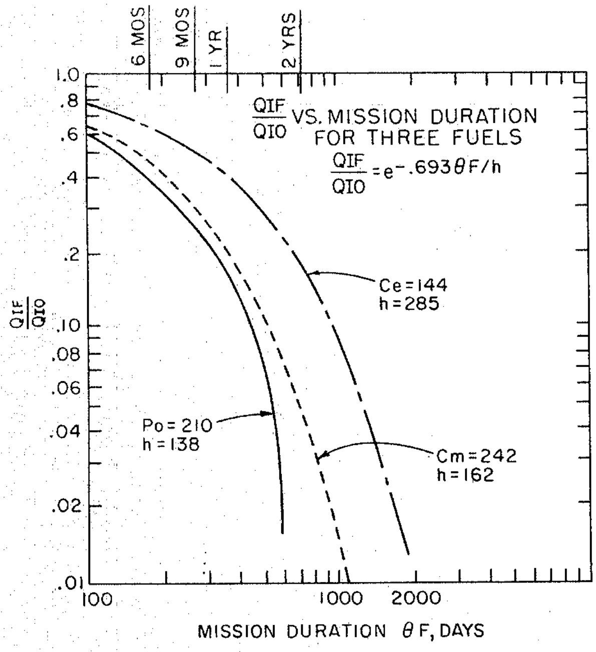
FIG. 1 is a graphic illustration of heat ratio vs. mission time ($\theta_F$) for four suitable radioisotope sources for a radioisotope heated thermoelectric generator, referred to hereinafter as an RTG.

It is known that the variations in radioisotope heat output are due to the exponential decay in the number of radioactive nuclei present. FIG. 1 shows the value of heat ratio vs. ($\theta_F$) mission time for three useful radioisotope fuels. The only mode of heat rejection available for this heat in space is by radiation to the cold vacuum of space where the temperature is approximately 460 R., and since the efficiency of a thermoelectric generator (TEG) depends on the temperature differential from the hot junction to the cold junction of the thermoelectric material, e.g. lead telluride, which has a certain temperature limit, a power flattening system is required to insure that the safe temperature limit is not exceeded. At the same time it is desirable to permit the operation of the RTG at the highest safe level throughout the useful life of the system.

Figure 2:
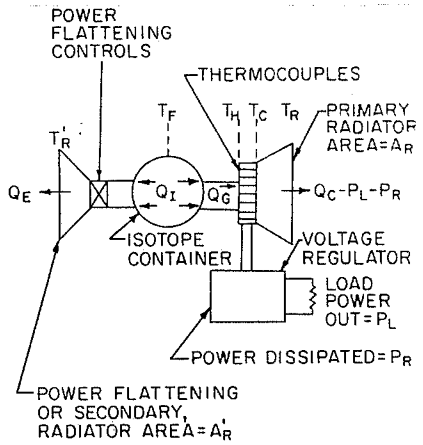
FIG. 2 is a schematic diagram of the heat flow in an idealized RTG system.

In this RTG system the heat from the source flows through a primary radiator system, comprising the thermoelectric generator elements and primary radiators connected thereto to provide the required temperature differential across the thermoelements, and a secondary radiator system having control means, as shown in FIG. 2, for throttling the excess heat therefrom in correspondence with the radioisotope decay of the source.

In order to explain how the method and apparatus of this invention accomplish the function of throttling the heat rejection through the secondary radiator system, reference is made to FIG. 3 wherein is illustrated a radioactive heat source 11, a primary radiator system 13 and a secondary radiator system 15. Each system is arranged with one section, or more than one parallel section, but for ease of explanation only one section in each system will be described. Disposed along the path of the primary radiator system is resistance 17 representing the impedance of the primary system 13 to the flow of heat therethrough to the cold vacuum of space 19. Gage 21 illustrates the amount of this heat flow, and when this indication remains constant the hot junction of the thermocouples remains constant as does the electrical output therefrom. The secondary radiator system 15 also has an impedance to the flow of heat from source 11 to the cold vacuum of space 19, here represented by resistance 23. Indicator 25 illustrates the flow of heat through this secondary system 15 to space 19.

Should the impedance to the flow of heat through the secondary system be increased so as to decrease the heat flow therethrough in correspondence with the decrease in the heat available in source 11, i.e. the temperature of source 11 as indicated by indicator 27, then the heat flow through the primary system 13, as well as the thermocouple temperature and electrical output therefrom, remains constant. For example, as the heat from source 11 changes from a maximum value in FIG. 3*a* through an intermediate value in FIG. 3*b* to a minimum value in FIG. 3*c* as indicated by the position of the indicator arm 29 in these figures, the impedance to the flow of heat in the secondary system 15 changes in correspondence therewith from a maximum value commensurate with the start of the mission to a minimum value at the end of the mission as indicated by indicator arm 31 in these figures.

Since the longest mission life, most advantageous mission operation and highest end-of-mission efficiency are achieved by a smooth gradual change in the impedance from a maximum to a minimum condition, the impedance of secondary system 13 changes smoothly and gradually, in accordance with this invention, from a low impedance condition to a complete impedance or substantially zero heat output condition. To this end the secondary system 13 has an input means 33 from source 11 and an evaporable heat conducting control means interposed between this input and the secondary radiator 35 whereby the heat conduction by the control means causes the control to evaporate smoothly. Also, the evaporation of this control conductor from a maximum thickness, or heat transfer control path 37, until it breaks or substantially disappears into the cold vacuum of space, achieves the required smooth change in impedance to the flow of heat in the secondary radiator system 15.

A practical arrangement incorporating the system of this invention, is shown in FIG. 4. Here generator 41 has a suitable radioisotope (radio-nuclide) heat source 11 and the heat therefrom flows outwardly through suitable thermal conductors, such as stainless steel container 45 and beryllium shoes 47 to the hot junctions 49 of an annular array of thermocouples 51 for the production of a temperature difference across the thermocouples. This produces an electrical potential proportional to this temperature difference for energizing a load, such as battery 53. In order to produce a suitably high temperature differential, primary metallic cooling fins 55 cool the cold junctions 57 of the thermocouples by transferring heat from the cold junctions to the cold vacuum of the space 19 around the generator 41 e.g. when the generator is in an earth orbital mission. Advantageously cooling fins 55 provide the desired end of mission temperature differential and due to the well known radio-nuclide decay and subsequent temperature drop in source 11 an excess of heat must be ejected from the generator during most of its designed operational lifetime to maintain a relatively constant thermocouple temperature for providing a flat output from the thermocouples to battery 53.

The secondary heat ejection path for this excess heat, comprises source 11, input conductor 33 comprising an extension of container 45, evaporable means 37, and secondary radiator 35. These elements being disposed between the cold vacuum of space 19 and the hot source 11 provide an external heat rejection path for the excess heat from source 11 thereby to provide the desired temperature at hot junction 49 and the desired output from thermocouples 51 to load 53. This heat also causes the evaporable means 37 gradually to sublime into the vacuum space 19 surrounding the generator 11 so as to throttle the heat removal through secondary radiator 35. This throttling is slow and gradual and this throttling effectively compensates for or counteracts the slow gradual decrease in the temperature of source 11 and maintains a constant temperature at hot junction 49 as well as correspondingly flattened power output from thermocouples 51 to load 53.

The evaporable means 37 sublimes most rapidly initially, as will be understood from a graph of the temperature vs. vapor pressure of the material for means 37, where it is shown that the rate of evaporation changes rapidly for each downward change in temperature of source 11 caused by the radio-nuclide decay thereof. Referring to FIG. 5, for example, which is a temperature vs. vapor pressure curve for a manganese evaporable means 37, the rate of evaporation of the manganese changes by more than one order of magnitude for each change of about 100° in temperature. It will also be understood that the same rate of change will apply to other metal means 37 as is evident from the curves given in FIG. 6.

If a system effectiveness $\gamma$ is part of the given specification for the generator mission, then the following equation completely defines the time variation of $\overline{A}$ (average area) of means 37 required:

$$\overline{A}=\frac{Q_g L}{K}\quad\frac{\dfrac{e^{-.693\theta/h}}{\gamma}-1}{T_I-\left[C\cdot\left(\dfrac{e^{-.693\theta/h}}{\gamma}-1\right)\right]}$$

where $Q$=heat flow in B.t.u./hr.
$L$=length in inches
$K$=exponent for polytropic gas process (thermal conductivity evaporable material)
$T$=temperature in °R., °K.
$C$=constant
$\gamma$=system effectiveness
$\theta$=time in days, years
$h$=source half life in days, years
$\gamma$=mission life/source half life vs. ($Q_{E_O}$) initial excess heat/($Q_{EF}$) final excess heat as shown by FIG. 7.
$O$=start of life
$F$=end of life
$G$=thermoelectric generator
$I$=radioisotope source
$R$=radiator If we now observe that the rate of evaporation is a function of ($T_I$) source temperature vs. ($T_R$) radiator temperature, it becomes clear that the profile of the base 37 will have to be adjusted. In effect, the initial profile of the base must be such that the varying rates of evaporation along the length (L) of the base causes the effective area A to vary in accordance with this last above-mentioned equation.

In this arrangement for providing the required profile or change in evaporation rate vs. time, means 37 has an exposed area that varies as it evaporates. To this end the evaporable means 37 is annular with an inside cylindrical diameter 77 forming a cylindrical base 79 next to the input 33, and has an hour glass outside, in the cross-section, with a symmetrically dished out (or curved) side 81 which slopes from a narrow channel portion to wide channel portions having opposite edges 83. This provides opposite annular exposed mouth portions 85 and the initial outside exposed area is $A_o$=0.1 to 0.3 times the secondary radiator area. Advantageously the opposite mouths 85 are equal and flat in area and the evaporations from the opposite mouths 85, and their narrow symmetrically opposite channels forming these mouths, tend to cancel out the opposite recoil pressure due to evaporation of their evaporating material 37 into space 19. As the cross-sectional area decreases the amount of heat conducted by radiator base means 37 decreases to provide the required adjustment for the change in the source temperature minus the secondary radiator temperature. Likewise this radiator base means 37 completely evaporates by the end of the mission of generator 41 so as to leave a gap 89 with a high impedance to heat flow between the secondary radiator 35 and the heat source 11. Advantageously, to this end, the surfaces 91 and 93 of gaps 89 have high conductivity low emissivity shields 95, comprising e.g. thin gold coatings, and low heat conductivity tight fitting insulator rods 97 having suitable enlarged holding portions 99 between the secondary radiator 35 and container extension 33.

In a typical operation the source 11 is Cm-242 having a half-life of 162 days and produces a heat flow through the primary radiator 13 of 1000 watts with a temperature differential of about 400° F. across the thermocouples to energize a 20 watt, 6 volt, 1.8 ohm load. The initial temperature at the source may advantageously be 1600° F.+460=2060° R. so as to provide an excess heat of 341.5 B.t.u./hr. The final source or mission end temperature is about 400° F. less than the initial temperature.

In order to provide a ratio of mission time $\theta$ to source half-life i.e. $\theta_F/h=.75$ to 1.0 with a manganese evaporable conductor 37 having a vapor pressure of .13, a molecular weight of 54.93, a density of 7.2 gms./cm.$^3$ and a thermal conductivity of 18.2 B.t.u./hr. ft.° F., the secondary radiator area is about .211 ft.$^2$ in a 6¼ inch diameter disc, and the conductor 37 has an exposed conductor area of .00482 cm.$^2$, a length of 2.54 cm. and an average area A of .034 ft.$^2$ or 4.90 in.$^2$. The radiators are advantageously aluminum but other suitable materials may be used, e.g. silver or copper with emissivities of .8–.9.

It will be understood from the above that the slope of the vapor pressure vs. temperature curve is important in that the slope of the evaporation curve determines the profile of the base. Since all metals have about the same slope on a log-log curve showing vapor pressure vs. temperature, the rate with temperature will be about the same for pure metals, such as e.g., Ag, Al, Bu, Ca, Cu, Mg, Mn, Sb and Zn and for their alloys.

Simple inorganic compounds may also be used for conductor 37 and to this end a very wide range of sublimation rates are available. For example, metal oxides, whose emissivity and melting points are in the desired ranges for power flattening may be used. Additionally, inorganic compounds may be used which decompose to elemental materials and then volatilize. Examples of these are given in the following table:

EVAPORATION RATES OF INORGANIC COMPOUNDS USEFUL FOR POWER FLATTENING, CALCULATED AT 1,000° K. (1340 F.)

| Compound | Melt. Point, ° F. | Molecular Weight M of Metal | Density of Compound e, gm./cc. | Vapor Press. of Metal P′, mm. Hg | Δ° F./T, cal./mol, ° K. | Dissociation Pressure P(M), mm. Hg | Evaporation Rate G, cms./yr. | Range of Utility, ° Kelvin |
|---|---|---|---|---|---|---|---|---|
| BaO | >3,500 | 137.3 | 5.72 | $9\cdot10^{-2}$ | −23.00 | $9.8\cdot10^{-3}$ | $1.18\cdot10^{4}$ | 800–850 |
| BeO | 4,660 | 9.02 | 3.03 | $2\cdot10^{-8}$ | −7.76 | $4.07\cdot10^{-5}$ | 2.38 | 950–1,000 |
| CaO | 4,660 | 40.08 | 3.40 | $2\cdot10^{-1}$ | −15.26 | $1.10\cdot10^{-2}$ | $5.87\cdot10^{3}$ | 800–850 |
| CuO | 1,880 dec. | 63.57 | 6.40 | $8\cdot10^{-9}$ | −16.55 | $2.3\cdot10^{-5}$ | 1.69 | 950–1,000 |
| MgO | >4,500 | 23.32 | 3.65 | $1\cdot10^{-1}$ | −11.70 | 1.0 | $7.94\cdot10^{4}$ | 800–250 |
| MnO | 3,000 | 54.93 | 5.45 | $2\cdot10^{-5}$ | −20.15 | $2.63\cdot10^{-5}$ | 3.68 | 950–1,000 |
| MnS | 2,950 | 54.93 | 3.99 | $2\cdot10^{-5}$ | −24.95 | $1.36\cdot10^{-4}$ | 48.5 | 900–950 |
| PbO | 1,630 | 207.2 | 9.53 | $1\cdot10^{-2}$ | −27.23 | $1.9\cdot10^{-4}$ | 16.9 | 950–1,000 |
| SnS | 1,620 | 118.70 | 6.18 | $1\cdot10^{-7}$ | +3.29 | $1.5\cdot10^{-3}$ | 156 | 900–950 |
| $SnO_2$ | 1,620 | 118.70 | 5.08 | $1\cdot10^{-7}$ | −119.77 | $1.6\cdot10^{-15}$ | $2\cdot10^{-8}$ | >1,400 |
| ZnO | ~3,270 | 65.38 | 5.61 | $9\cdot10^{1}$ | −16.10 | 4.92 | $4.18\cdot10^{5}$ | 750-800 |

Here the sublimation is a two-step process depending on the decomposition rate of the compound and the evaporation rates of the elements. This is exemplified by the case of barium oxide which disassociates at $1.18\times10^4$ cms./yr. at 1000° K. In the case of cupric oxide the disassociation at 1000° K. is 1.69 cms./yr. whereas the rate of evaporation of the copper is $4.74\times10^{-2}$ cms./yr. At 900° K. the cupric oxide disassociates at $4.1\times10^{-2}$ so that a decrease of 100° K. results in a rate of evaporation lower by two orders of magnitude. Carbonates, fluorides, and sulfides may also be employed.

The Langmuir equation based on kinetic theory gives the rate of evaporation. For example, the evaporation of a pure metal into a vacuum is $$W=\frac{eG}{12.5\times10^6}=\frac{p}{17.14}\frac{(M)}{(T)}^{1/2}$$

where $W$=rate of evaporation, gm./cm.$^2$/sec.
$G$=rate of evaporation, cms./yr.
$e$=density of solid metal, gm/cm.$^3$
$p$=vapor pressure, mm. Hg
$M$=molecular weight of material in gas phase
$T$=temperature, ° K.

The profile of conductor 37 may also be suitably modified by diluting the evaporating material with an inert, refractory filler. For example, manganese powder may be distributed in a desired concentration gradient in a matrix of a low thermal conductivity porous ceramic insulator which has sufficient porosity to allow the manganese to evaporate therethrough. In this embodiment, the concentration of the manganese is highest in the area of conductor 37 next to the container extension or input 33 and least in the area next to the secondary radiator 15. Here the conductor 37 has the dimensions of the above described embodiment but with a uniform outside diameter.

This invention has the advantage of providing a radioisotope heated thermoelectric generator and an improved power flattening system therefor with a reduced number of moving parts. Also, this system is light in weight and highly effective since it contemplates a secondary heat path having a small base material that completely evaporates to leave only a gap or supporting skeleton of low conductivity material. Additionally this invention is simple, reliable, safe and operates to flatten the generator output smoothly and gradually with a minimum amount of auxiliary or actuating equipment.

I claim:

1. A radioisotope powdered thermoelectric generator for use in a vacuum, comprising a radioisotope heat source, a primary heat rejection path having thermocouples forming hot and cold junctions for producing electric current from the heat supplied by said heat source, external secondary radiator means for ejecting excess heat to said vacuum, and external means evaporable into said vacuum connecting said heat source and said external secondary radiator means to cause said evaporation and to eject said heat for throttling said heat ejectment from said secondary radiator means by decreasing the conductance of heat to said external secondary radiator means as said evaporable means evaporates into said vacuum, said external evaporable means being shaped with large exposed initial area and a decresing exposed evaporation area for compensating for the change in the source temperature minus the external secondary radiator means temperature and being connected to said source and radiator through low emissivity shields for high end-of-life efficiency, said evaporation being sufficient to maintain a constant electric current until the end of said generator operating life-time at which time said evaporation is complete.

2. The invention of claim 1 wherein said conducting means is manganese having an initial exposed area 0.1 to 0.3 times the secondary radiator area and a variable evaporation for compensating for the change in source to radiator temperature for a high ratio of mission life to source half life.

3. The invention of claim 1 in which said conducting means is an oxide compound of a metal which is volatile in a vacuum whereby the rate of decomposition of the oxide compound to its elements decreases the evaporation rate of said metal in said vacuum.

4. The invention of claim 1 in which said conducting means is mixed with a low thermal conducitvity filler having sufficient porosity to allow said metallic conducting means to evaporate therethrough.

5. The invention of claim 1 in which said conducting means is mixed with a low thermal conductivity filler having a gradient with the highest concentration of metal conducting means next to said source.

6. The invention of claim 1 in which said conducting means is shaped for evaporation from opposite ends for cancelling the recoil pressure due to the evaporation.

7. The invention of claim 1 in which said conducting means evaporates completely to form a gap between said source and radiators for blocking the heat transfer therebetween for providing high end-of-life generator efficiency.

8. The method of throttling the removal of heat from a radioactive heat source, comprising removing heat from said source in a vacuum with means that said heat removal causes slowly to sublimate into said vacuum in correspondence with the reduction in the heat from said source due to radioactive decay, said means having an exposed area that decreases in size due to said sublimation in correspondence with the radioactive decay of said source.

References Cited by the Examiner

UNITED STATES PATENTS

| | | | |
|---|---|---|---|
| Re. 19,114 | 3/1934 | Stein et al. | 290—2 |
| 2,765,414 | 10/1956 | Gendler et al. | 290—2 |
| 3,133,212 | 5/1964 | Szekely | 310—4 |
| 3,192,069 | 6/1965 | Vogt et al. | 136—202 |
| 3,243,613 | 3/1966 | Grover | 176—39 |
| 3,252,015 | 5/1966 | Johnson | 310—4 |

WINSTON A. DOUGLAS, *Primary Examiner.*

A. M. BEKELMAN, *Assistant Examiner.*